United States Patent
Bockenstette et al.

(10) Patent No.: US 9,074,664 B2
(45) Date of Patent: *Jul. 7, 2015

(54) NINE SPEED TRANSMISSION WITH LATCHING MECHANISM

(71) Applicant: GM Global Technology Operations LLC, Detroit, MI (US)

(72) Inventors: Casie M. Bockenstette, Clarkston, MI (US); Carlos E. Marin, Oxford, MI (US); Paul G. Otanez, Troy, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,903

(22) Filed: Jun. 19, 2013

(65) Prior Publication Data

US 2014/0378266 A1    Dec. 25, 2014

(51) Int. Cl.
*F16H 3/62* (2006.01)

(52) U.S. Cl.
CPC .......... *F16H 3/62* (2013.01); *F16H 2200/2012* (2013.01); *F16H 2200/2082* (2013.01); *F16H 2200/2046* (2013.01)

(58) Field of Classification Search
CPC .............. F16H 2200/0065; F16H 2200/2012; F16H 2200/2082; F16H 2200/2047; F16H 2200/2046; F16H 3/62
USPC ............................ 475/275–291, 330; 477/115
See application file for complete search history.

(56) References Cited

U.S. PATENT DOCUMENTS

| | | | |
|---|---|---|---|
| 4,729,462 A | 3/1988 | Braun | |
| 6,022,288 A * | 2/2000 | Cho | 475/276 |
| 6,771,031 B1 | 8/2004 | Bai | |
| 7,699,741 B2 | 4/2010 | Hart et al. | |
| 8,591,376 B1 * | 11/2013 | Shim et al. | 475/276 |
| 2005/0258013 A1 | 11/2005 | Stevenson et al. | |
| 2008/0207381 A1 | 8/2008 | Wittkopp et al. | |
| 2008/0293537 A1 * | 11/2008 | Phillips | 475/283 |
| 2008/0314711 A1 | 12/2008 | Jayaram et al. | |
| 2009/0280941 A1 | 11/2009 | Dusenberry et al. | |
| 2010/0063693 A1 | 3/2010 | Lee et al. | |
| 2010/0248890 A1 | 9/2010 | Baldwin | |
| 2010/0331138 A1 * | 12/2010 | Phillips | 475/278 |
| 2012/0138412 A1 * | 6/2012 | Rogner | 192/85.23 |

(Continued)

OTHER PUBLICATIONS

Farzad Samie and Chunhao Joseph Lee, Selectable One-Way Clutch in GM's RWD 6-Speed Automatic Transsmisions, SAE Int., Jan. 2009, vol. 2, Issue 1, Brice Pawley Means Industries, USA.

(Continued)

*Primary Examiner* — Roger Pang (57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes including a selectable one-way clutch actuatable in combinations of two to establish a plurality of forward gear ratios and one reverse gear ratio. The transmission also includes a transmission auto start/stop enabler which includes a latch mechanism. The latch mechanism readies one of the plurality of torque transmitting devices during an engine auto stop/start event or in preparation for a stop of the motor vehicle.

20 Claims, 4 Drawing Sheets

(56) References Cited

U.S. PATENT DOCUMENTS

| | | |
|---|---|---|
| 2012/0193188 A1 | 8/2012 | Neelakantan et al. |
| 2012/0196718 A1* | 8/2012 | Hart et al. ............... 475/271 |
| 2012/0270694 A1* | 10/2012 | Seo et al. ............... 475/276 |
| 2012/0302393 A1* | 11/2012 | Seo et al. ............... 475/276 |
| 2013/0047759 A1 | 2/2013 | Bockenstette et al. |
| 2013/0109527 A1* | 5/2013 | Mellet et al. ............. 475/275 |
| 2013/0225358 A1* | 8/2013 | Singh ...................... 475/276 |
| 2013/0324346 A1* | 12/2013 | Garcia et al. ............ 475/205 |
| 2014/0038764 A1* | 2/2014 | Goleski ................... 475/275 |

OTHER PUBLICATIONS

Pending U.S. Appl. No. 61/636,963, filed Apr. 23, 2012, by Ross et al. All pages.

Pending U.S. Appl. No. 61/640,944, filed May 1, 2012, by Ross et al. All pages.

\* cited by examiner

| GEAR STATE | GEAR RATIO | RATIO STEP | CLUTCHING ELEMENTS | | | | | | |
|---|---|---|---|---|---|---|---|---|---|
| | | | 34 | 30 | 36 | 32 | 26 | 24 | 28 |
| REV | -2.960 | | X | | | | | X | |
| N | | -0.63 | O | | | | | | |
| 1ST | 4.689 | 1.42 | X | | | | | | |
| 2ND | 3.306 | 1.10 | | | X | X | | | |
| 3RD | 3.012 | 1.23 | | X | X | | | | |
| 4TH | 2.446 | 1.27 | | | X | | | | |
| 5TH | 1.923 | 1.33 | | | X | | | X | |
| 6TH | 1.446 | 1.45 | | | | | X | X | |
| 7TH | 1.000 | 1.34 | | X | | | X | | |
| 8TH | 0.747 | 1.21 | | | | X | X | | |
| 9TH | 0.617 | | | | | | X | | X |

X = ON - ENGAGED CARRYING TORQUE
O = ON - ENGAGED NOT CARRYING TORQUE

NINE SPEED TRANSMISSION WITH LATCHING MECHANISM

FIELD

The invention relates generally to a multiple speed transmission having a plurality of planetary gear sets and a plurality of torque transmitting devices and more particularly to a transmission having nine speeds, four planetary gear sets and one or a plurality of torque transmitting devices with a latching mechanism to enable automatic engine start/stop.

BACKGROUND

The statements in this section merely provide background information related to the present disclosure and may or may not constitute prior art.

A typical automatic transmission includes a hydraulic control system that, among other functions, is employed to actuate a plurality of torque transmitting devices and to provide lubrication and cooling to the components of the transmission. The conventional hydraulic control system typically includes a main pump that provides a pressurized fluid, such as automatic transmission oil, to a plurality of valves and solenoids within a valve body. The main pump is driven by the engine of the motor vehicle. The valves and solenoids are operable to direct the pressurized hydraulic fluid through a hydraulic fluid circuit to the components of the transmission. For example the pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Therefore, there is a need in the art for an automatic transmission enabled for engine stop-start events such that the automatic start/stop event does not affect transmission operating performance.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes and include at least one selectable one-way clutch. The transmission includes an engine automatic start/stop enabler.

In one example of the present invention, the transmission includes an input member, an output member, first, second, third and fourth planetary gear sets each having first, second and third members, and seven torque transmitting mechanisms selectively engageable to interconnect one of the first, second, and third members with at least one other of the first members, second members, third members and a stationary member. The torque transmitting mechanisms are selectively engageable in combinations of at least two to establish at least nine forward speed ratios and at least one reverse speed ratio between the input member and the output member. A latching mechanism is connected to a sixth of the seven torque transmitting mechanisms. The latching mechanism latches the sixth torque transmitting mechanism in a ready state. The ready state refers to various states or conditions of the clutch may include a filled state where oil is fed to the circuits that actuate the clutch, a staged state where the clutch has been moved to near full engagement, and an engaged state where the clutch is fully engaged and ready to transmit torque, or any other state in between. The sixth torque transmitting mechanism is in the ready state during a first forward gear.

In another example of the present invention the sixth torque transmitting mechanism is in the ready state during a reverse gear.

In yet another example of the present invention the latching mechanism latches the sixth torque transmitting device during a startup of the motor vehicle after an automatic engine stop event or in preparation for a stop of the motor vehicle.

In yet another example of the present invention the latching mechanism is a hydraulic latching mechanism.

In another example of the present invention the latching mechanism is a mechanical latching mechanism that is mechanically coupled to the sixth torque transmitting mechanism.

In yet another example of the present invention, a first interconnecting member continuously interconnects the ring gear of the first planetary gear set with the carrier member of the second planetary gear set.

In yet another example of the present invention, a second interconnecting member continuously interconnects the carrier member of the first planetary gear set with the ring gear of the third planetary gear set.

In yet another example of the present invention, a third interconnecting member continuously interconnects the ring gear of the second planetary gear set with the carrier member of the third planetary gear set.

In yet another example of the present invention, a fourth interconnecting member continuously interconnects the carrier member of the third planetary gear set with the carrier member of the fourth planetary gear set.

In yet another example of the present invention, a first torque transmitting device is selectively engageable to interconnect the sun gear of the third planetary gear set with the input member.

In yet another example of the present invention, a second torque transmitting device is selectively engageable to interconnect the ring gear of the second planetary gear set and the carrier member of the third planetary gear set with the sun gear of the second planetary gear set and the input member.

In yet another example of the present invention, a third torque transmitting device is selectively engageable to interconnect the carrier member of the fourth planetary gear set with the sun gear of the fourth planetary gear set.

In yet another example of the present invention, a fourth torque transmitting device is selectively engageable to interconnect the sun gear of the third planetary gear set with the stationary member.

In yet another example of the present invention, a fifth torque transmitting device is selectively engageable to interconnect the sun gear of the fourth planetary gear set with the stationary member.

In yet another example of the present invention, the sixth torque transmitting device is selectively engageable to interconnect the carrier member of the fourth planetary gear set with the stationary member.

In yet another example of the present invention, a seventh torque transmitting device is selectively engageable to interconnect the sun gear of the first planetary gear set with the stationary member.

In yet another example of the present invention, the torque transmitting devices are each selectively engageable in combinations of at least two to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the multi-speed automatic transmission having an automatic engine start/stop enabler of the present invention have an arrangement of permanent mechanical connections between the elements of the four planetary gear sets. For example, a first component or element of a first planetary gear set is permanently coupled to a second component or element of the second planetary gear set. A second component or element of the first planetary gear set is permanently coupled a third component or element of the third planetary gear set and to a third component or element of the fourth planetary gear set. A third component or element of the second planetary gear set is permanently coupled to a second component or element of the third planetary gear set and a second component or element of the fourth planetary gear set. A second component or element of the third planetary gear set is permanently coupled a second component or element of the fourth planetary gear set. A third component or element of the third planetary gear set is permanently coupled a third component or element of the fourth planetary gear set.

Figure 1:
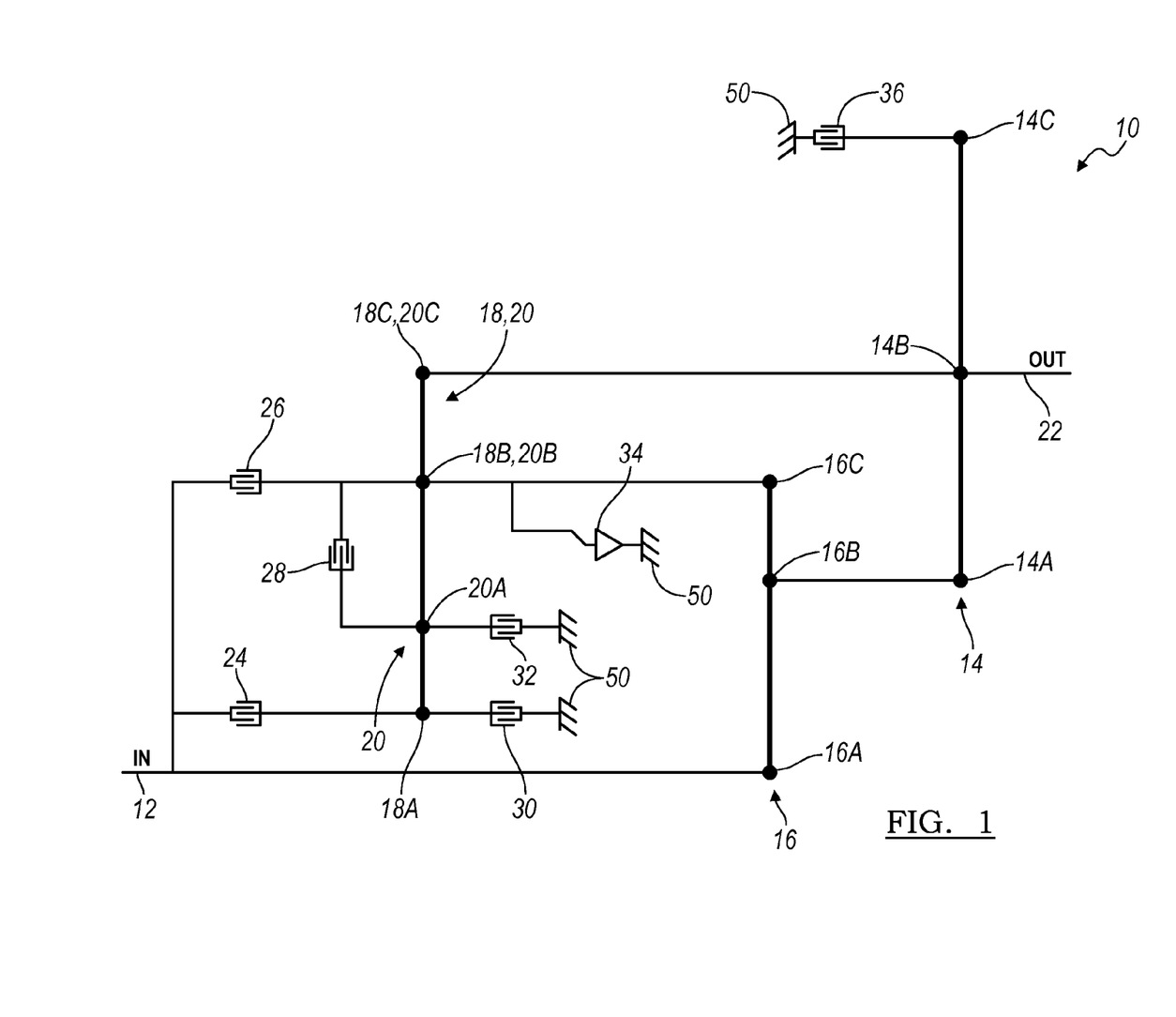
FIG. 1 is a lever diagram of a nine speed transmission according to the principles of the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. The first planetary gear set 14 has three nodes: a first node 14A, a second node 14B and a third node 14C. The second planetary gear set 16 has three nodes: a first node 16A, a second node 16B and a third node 16C. In the lever diagram of FIG. 1, the levers for the third planetary gear set 18 and the fourth planetary gear set 20 have been combined into a single four node lever having: a first node 18A, a second node 20A, a third node 18B, 20B, and a fourth node 18C, 20C. Thus, the second member 18B of the third planetary gear set 18 is coupled directly to the second member 20B of the fourth planetary gear set 20 and the third member 18C of the third planetary gear set 18 is coupled directly to the third member 20C of the fourth planetary gear set 20.

The input member 12 is continuously coupled to the first node 16A of the second planetary gear set 16. The output member 22 is coupled to the second node 14B of the first planetary gear set 14 and the fourth node 18C, 20C of the combined levers of the third and fourth planetary gear sets 18, 20. The first node 14A of the first planetary gear set 14 is coupled to the second node 16B of the second planetary gear set 16. The third node 16C of the second planetary gear set 16 is coupled to the third node 18B, 20B of the combined levers of the third and fourth planetary gear sets 18, 20.

A first clutch 24 selectively connects the first node 16A of the second planetary gear set 16 and the input member or shaft 12 with the first node 18A of the combined levers of the third and fourth planetary gear sets 18, 20. A second clutch 26 selectively connects the first node 16A of the second planetary gear set 16 and the input member or shaft 12 with the third node 18B, 20B of the combined levers of the third and fourth planetary gear sets 18, 20 and the third node 16C of the second planetary gear set 16. A third clutch 28 selectively connects the third node 18B,20B of the combined levers of the third and fourth planetary gear sets 18, 20 with the first node 20A of the fourth planetary gear set 20. A first brake 30 selectively connects the first node 18A of the combined levers of the third and fourth planetary gear sets 18, 20 with a stationary member or transmission housing 50. A second brake 32 selectively connects the second node 20A of the combined levers of the third and fourth planetary gear sets 18, 20 with a stationary member or transmission housing 50. A third brake or selectable one-way clutch (SOWC) 34 selectively connects the third node 18B,20B of the combined levers of the third and fourth planetary gear sets 18, 20 and the third node 16C of the second planetary gear set 16 with the stationary member or transmission housing 50. A fourth brake 36 selectively connects the third node 14C of the first planetary gear set 14 with the stationary member or transmission housing 50.

Figure 2:
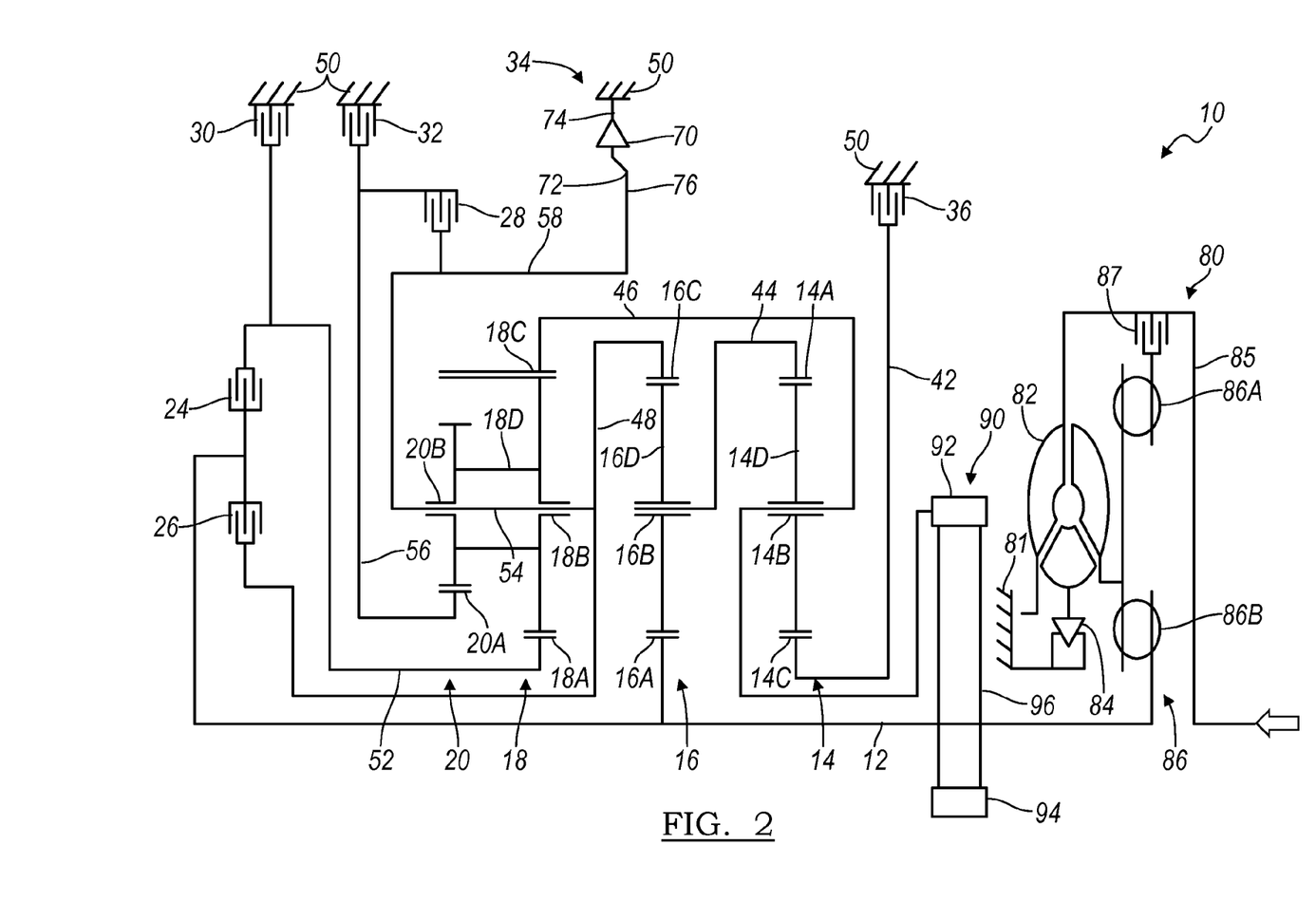
FIG. 2 is an example of a diagrammatic illustration of an embodiment of a nine speed transmission according to the principles of the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with a third shaft or interconnecting member 46 and the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a fourth shaft or interconnecting member 48. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of stepped planet gears 18D (only one of which is shown). The stepped pinions 18D each have two different diameter portions, each portion corresponding to one of the gear sets 18 and 20. The sun gear member 18A is connected for common rotation with a fifth shaft or interconnecting member 52. The ring gear member 18C is connected for common rotation with the third shaft or interconnecting member 46. The planet carrier member 18B is connected for common rotation with the fourth shaft or interconnecting member 48 and with a sixth shaft or interconnecting member 54. The stepped planet gears 18D are each configured to intermesh with both the sun gear member 18A and the ring gear member 18C and with the planetary gear set 20 as described below.

The planetary gear set 20 includes a sun gear member 20A and a planet gear carrier member 20B that rotatably supports the set of stepped planet gears 18D (only one of which is shown). The sun gear member 20A is connected for common rotation with a seventh shaft or interconnecting member 56. The planet carrier member 20B is connected for common rotation with the sixth shaft or interconnecting member 54 and with an eighth shaft or interconnecting member 58. The stepped planet gears 18D are each configured to intermesh with the sun gear member 20A. The planetary gear set 20 does not include a separate ring gear member, thereby reducing the cost and packaging requirements of the planetary gear set. Instead, the planetary gear set 20 shares a ring gear with planetary gear set 18.

The torque-transmitting mechanisms or clutches 24, 26, 28 and brakes 30, 32, 34 and 36 allow for selective interconnection of the shafts or interconnecting members, members of the planetary gear sets and the housing. The clutches 24, 26, 28 and brakes 30, 32, and 36 are friction, dog or synchronizer type mechanisms or the like, while the brake 34 may be a SWOC. For example, the first clutch 24 is selectively engageable to connect the input shaft or member 12 with the fifth shaft or interconnecting member 52. The second clutch 26 is selectively engageable to connect the input shaft or member 12 with the fourth shaft or interconnecting member 48. The third clutch 28 is selectively engageable to connect the seventh shaft or interconnecting member 56 with the eighth shaft or interconnecting member 58. In one embodiment the third clutch 28 is applied through a bearing assembly where the actuating mechanism (piston) is non-rotating. The first brake 30 is selectively engageable to connect the fifth shaft or interconnecting member 52 with the stationary element or the transmission housing 50 in order to restrict the member 52 from rotating relative to the transmission housing 50. The second brake 32 is selectively engageable to connect the seventh shaft or interconnecting member 56 with the stationary element or the transmission housing 50 in order to restrict the member 56 from rotating relative to the transmission housing 50. The third brake or SWOC 34 is selectively engageable to connect the eighth shaft or interconnecting member 58 with the stationary element or the transmission housing 50 in order to restrict the member 58 from rotating relative to the transmission housing 50. The fourth brake 36 is selectively engageable to connect the first shaft or interconnecting member 42 with the stationary element or the transmission housing 50 in order to restrict the member 42 from rotating relative to the transmission housing 50.

The SWOC 34 generally includes a one-way clutch mechanism 70 and a locking mechanism 72. The clutch mechanism 70 generally includes an input 74 connected to the stationary member 50 and an output 76 connected to the eighth shaft or interconnecting member 58. The clutch mechanism 70 may be any type of one-way clutch including, but not limited to, roller, pawl, sprag, mechanical diode, and rocker clutches. The locking mechanism 72 selectively locks and unlocks the clutch mechanism 70 and may include rocker, diode, strut, or dog clutch type locking mechanisms. Several examples of selectable one-way clutches that may be used are described in SAE Paper No. SAE-2009-01-0509, which is herein incorporated by reference in its entirety.

When the SOWC 34 is unlocked, the SOWC 34 operates in the same manner as a traditional one-way clutch where the output 76 may rotate freely relative to the input 74 in a first rotational direction but may not rotate freely relative to the input 74 in a second opposite rotational direction. When the locking mechanism 72 is engaged or locked, the output 76 may not rotate relative to the input 74 in either rotational direction. It should be noted that the SOWC 34 may include up to four modes of operation. For example, the SOWC 34 may also include an open position. In the open position, the locking mechanism 72 unlocks the output 76 from the input 74 in both rotational directions. The SOWC 34 may also include another unlocked position where the SOWC 34 allows the output 76 to rotate freely relative to the input 74 in the second rotational direction but does not allow the output 76 to rotate freely relative to the input 74 in the first rotational direction.

The input shaft or member 12 is continuously connected to a torque convertor such as the starting device 80, and the output shaft or member 22 is continuously connected to an output transfer mechanism 90. The starting device 80 includes a torus 82 contained within a housing 81 coupled to the transmission housing 50. The torus 82 is connected to a stator through a one-way clutch 84 that insures that the torus rotates in only one direction. The torus 82 is also connected to the motor vehicle engine by a shaft or member 85. The starting device 80 further includes a dual spring/damper assembly 86 with two spring/dampers 86A and 86B. The spring/damper assembly 86 is selectively coupled to the torus 82 with a clutch 87 to minimize vibrations transmission to the transmission 10. Further, torque from the engine is transmitted to the transmission 10 when the clutch 87 is engaged. In other implementations, the starting device 80 can include a fluid clutch that is subjected to a slip effect and optionally provided with a lockup clutch, a wet or dry type friction clutch, or a P2 electric motor device.

Figure 3:
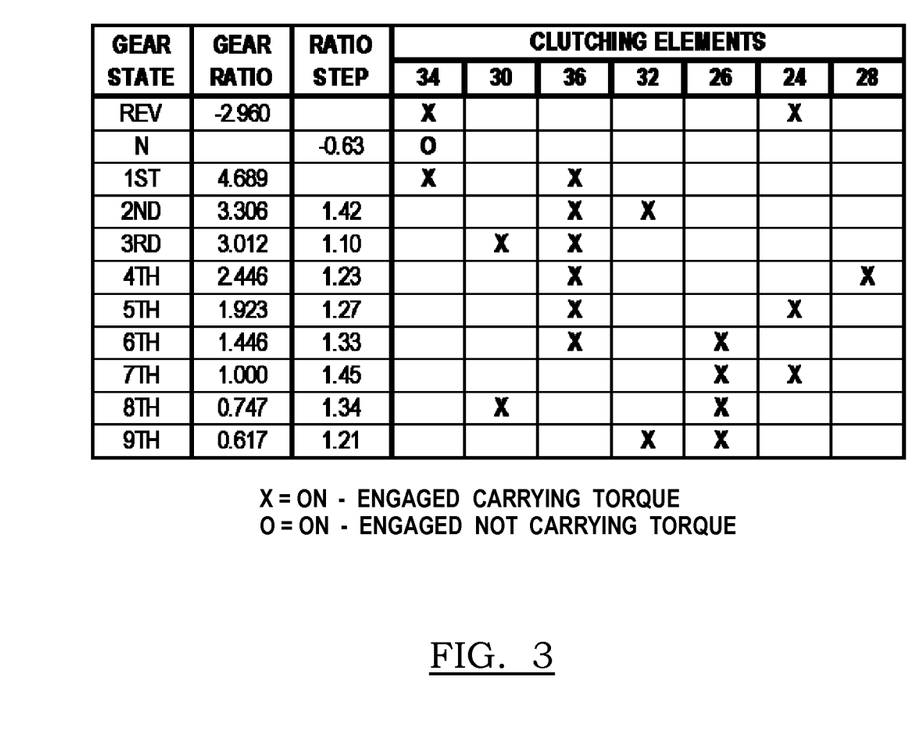
FIG. 3 is a truth table presenting the state of engagement of the various torque transmitting elements in each of the available forward and reverse speeds or gear ratios of the transmissions illustrated in FIGS. 1 and 2.

Referring now to FIG. 2 and FIG. 3, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of two or more of the torque-transmitting mechanisms (i.e. first clutch 24, second clutch 26, third clutch 28, first brake 30, second brake 32, third brake 34 and fourth brake 36), as will be explained below. FIG. 3 is a truth table that presents the various combinations of torque-transmitting mechanisms that are activated or engaged to achieve the various gear states. An "X" in the box means that the particular referenced clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

With specific reference to FIG. 3, the truth table is presented illustrating a state of engagement of the various torque transmitting elements in each of the available forward and reverse speeds or gear ratios of the transmission 10. Accordingly, a reverse gear is established through the engagement or activation of the first clutch 24 and SWOC 34. The first clutch 24 connects the input shaft or member 12 with the fifth shaft or interconnecting member 52. The third brake 34 connects the eighth shaft or interconnecting member 58 with the stationary element or the transmission housing 50 in order to restrict the member 58 from rotating relative to the transmission housing 50. Likewise, the nine forward ratios are achieved through different combinations of clutch and brake engagement, as shown in FIG. 3.

Figure 4:
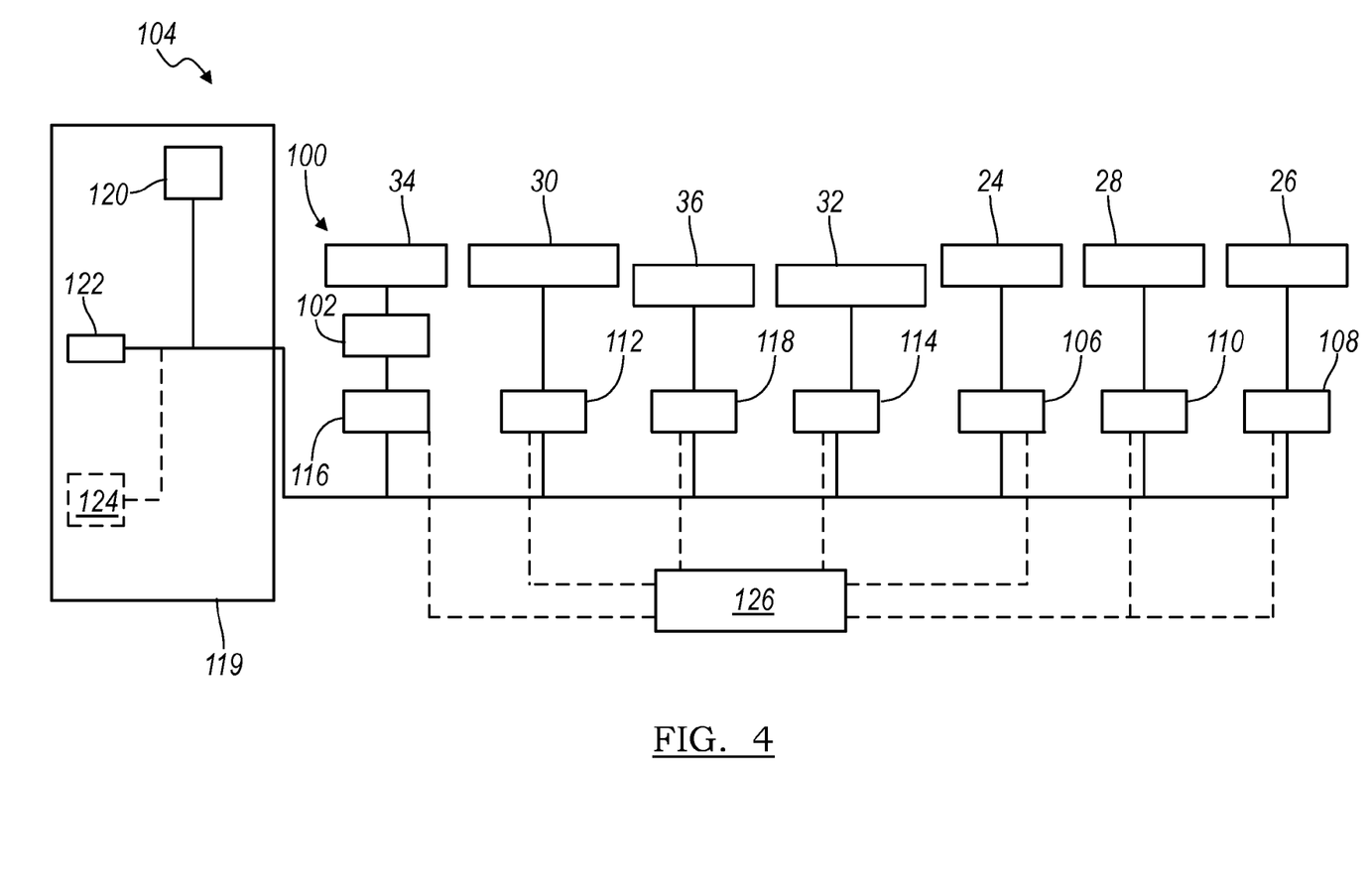
FIG. 4 is a block diagram of the transmission with an engine start/stop enabler.

Turning to FIG. 4, the transmission 10 includes an engine start/stop enabler system 100 that includes a locking or latching mechanism 102 associated with the third brake or SOWC 34. The locking mechanism 102 can be any suitable mechanism that places the respective clutch or brake, such as, for example, those described below, in a ready state. The ready state refers to various states or conditions of the clutch or brake that may include a filled state where oil is fed to the circuits that actuate the clutch, a staged state where the clutch has been moved to near full engagement, and an engaged state where the clutch is fully engaged and ready to transmit torque, or any other state in between. The transmission also includes a hydraulic control system 104 with a first solenoid 106, a second solenoid 108, a third solenoid 110, a fourth solenoid 112, a fifth solenoid 114, a sixth solenoid 116, and a seventh solenoid 118. In one embodiment the solenoids 106, 108, 110, 112, 114, 116, and 118 are variable force solenoids. In the particular arrangement shown in FIG. 4, the first solenoid 106 is in selective fluid communication with the first clutch 24. The second solenoid 108 is in selective fluid communication with the second clutch 26. The third solenoid 110 is in selective fluid communication with the third clutch 28. The fourth solenoid 112 is in selective fluid communication with the first brake 30. The fifth solenoid 114 is in selective fluid communication with the second brake 32. The sixth solenoid 116 is in selective fluid communication with the third brake 34. The seventh solenoid 118 is in selective fluid communication with the fourth brake 36.

It should be appreciated that the hydraulic control system 104 may include various other systems, modules, solenoids, etc., without departing from the scope of the present invention. For example, in various arrangements, the hydraulic control system 104 includes variable bleed solenoids or on/off devices or any other suitable devices to selectively engage the torque transmitting mechanisms 24, 26, 28, 30, 32, 34, and 36 by selectively communicating hydraulic fluid to the various torque transmitting mechanisms.

The solenoids 106, 108, 110, 112, 114, 116, and 118 are provided pressurized hydraulic fluid by a pressure regulator subsystem 119 that includes an engine driven pump 120 and an accumulator 122. The engine driven pump 120 communicates with the solenoids 106, 108, 110, 112, 114, 116, and 118. Alternatively the transmission 10 may include a second, auxiliary pump 124 in communication with the solenoids 106, 108, 110, 112, 114, 116, and 118. The pressure regulator subsystem 119 including the pump 120 and accumulator 122, as well as the solenoids 106, 108, 110, 112, 114, 116, and 118, receive instructions from a controller 126. The controller 126 may be a transmission control module (TCM), an engine control module (ECM), or a hybrid control module, or any other type of controller. The controller 126 is preferably an electronic control device having a preprogrammed digital computer or processor, control logic, memory used to store data, and at least one I/O peripheral. The control logic includes a plurality of logic routines for monitoring, manipulating, and generating data.

When the motor vehicle comes to a stop while the ignition key is in an ON state, an auto stop event may occur where the engine 79 is automatically turned off. An auto start event is then commanded based on certain indicators, such as accelerator pedal position. During the auto start when the engine 79 is turned back on and the motor vehicle begins to move, the motor vehicle typically starts again in first or reverse gear. That is, the torque transmitting mechanisms 24 and 34 are engaged for reverse gear; or torque transmitting mechanisms 34 and 36 are engaged for first gear. However, during the auto stop, the main pump 80 is no longer supplying pressure to the clutches and brakes. Accordingly, when the motor vehicle is ready to start again and the locking mechanism 102 is not employed, the transmission pump 120 is generally required to pump sufficient pressure to two of the torque transmitting mechanisms depending on which gear has been commanded. Sufficient pressure is preferably provided so that the torque transmitting mechanisms can be quickly engaged without lag when the vehicle starts again. Likewise the accumulator 122 is sized to provide sufficient fluid volume and flow, as moderated by respective solenoids 106, 108, 110, 112, 114, 116, and 118 to the torque transmitting mechanisms depending on which gear has been commanded. The accumulator 122 provides the system pressure as the pump restarts and builds pressure. Alternatively, the auxiliary pump 124 can be employed in place of the accumulator 122 to provide the appropriate hydraulic fluid pressure to the devices in the hydraulic control system 104 to selectively engage the torque transmitting mechanisms 24, 26, 30, 32, 34, and 36. In some arrangements a combination of two or all of the transmission pump 120, the accumulator 122, and the auxiliary pump 124 provides flow to the torque transmitting mechanisms.

With the implementation of the automatic start/stop enabler system 100 the brake 34 can be considered a holding brake. That is, prior to or at a start event, the locking mechanism 102 is activated to ready the brake 34. As such, the transmission pump 120 or the accumulator 122 or the auxiliary pump 124 only has to provide sufficient pressure or sufficient volume of hydraulic fluid to engage one of the remaining torque transmitting mechanisms 24 and 36 for first or reverse gear. Hence, with the use of the locking mechanism 102, the transmission pump 120 or the accumulator 122 or the auxiliary pump 124 is required to provide pressure or fluid volume for one torque transmitting mechanism for a start event, whereas without the locking mechanism 102, the transmission pump 120 or the accumulator 122 or the auxiliary pump 124 is required to provide pressure or fluid volume for two torque transmitting mechanisms for a start event.

The locking mechanism 102 is directly coupled to the third brake 34 and can be a mechanical latch or hydraulic latch or any other suitable mechanism and which can be under the control of the controller 126. For example, locking mechanisms are described in, but are not limited to, U.S. Provisional Application No. 61/636,963, filed Apr. 23, 2012, and U.S. Provisional Application No. 61/640,944, filed May 1, 2012, the contents of which are incorporated herein by reference in their entirety.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission in a motor vehicle, the transmission comprising:
   an input member;
   an output member;
   first, second, third and fourth planetary gear sets each having first, second and third members;
   seven torque transmitting mechanisms selectively engageable to interconnect one of the first, second, and third members with at least one other of the first members, second members, third members and a stationary member, wherein the torque transmitting mechanisms are selectively engageable in combinations of at least two to establish at least nine forward speed ratios and at least one reverse speed ratio between the input member and the output member; and
   a latching mechanism connected to a sixth of the seven torque transmitting mechanisms, wherein the latching mechanism latches the sixth torque transmitting mechanism in a ready state, and wherein the sixth torque transmitting mechanism is a selectable one-way clutch; and wherein the sixth torque transmitting mechanism is in the ready state during a first forward gear.

2. The transmission of claim 1 wherein the sixth torque transmitting mechanism is in the engaged state during a reverse gear.

3. The transmission of claim 1 wherein the latching mechanism latches the sixth torque transmitting device in preparation for an engine stop event.

4. The transmission of claim 1 wherein the latching mechanism is a hydraulic latching mechanism.

5. The transmission of claim 1 wherein the latching mechanism is a mechanical latching mechanism that is mechanically coupled to the sixth torque transmitting mechanism.

6. The transmission of claim 1 further comprising:
   a first interconnecting member continuously interconnecting the first member of the first planetary gear set with the second member of the second planetary gear set;
   a second interconnecting member continuously interconnecting the second member of the first planetary gear set with the third member of the third planetary gear set and the third member of the fourth planetary gear set; and
   a third interconnecting member continuously interconnecting the third member of the second planetary gear set with the second member of the third planetary gear set and the second member of the fourth planetary gear set.

7. The transmission of claim 6 wherein a first of the seven torque transmitting mechanisms is selectively engageable to interconnect the input member and the first member of the second planetary gear set with the first member of the third planetary gear set.

8. The transmission of claim 7 wherein a second of the seven torque transmitting mechanisms is selectively engageable to interconnect the input member and the first member of the second planetary gear set with the third member of the second planetary gear set, the second member of the third planetary gear set, and the second member of the fourth planetary gear set.

9. The transmission of claim 8 wherein a third of the seven torque transmitting mechanisms is selectively engageable to interconnect the first member of the fourth planetary gear set with the third member of the second planetary gear set, the second member of the third planetary gear set, and the second member of the fourth planetary gear set.

10. The transmission of claim 9 wherein a fourth of the seven torque transmitting mechanisms is selectively engageable to interconnect the first member of the third planetary gear set with the stationary member.

11. The transmission of claim 10 wherein a fifth of the seven torque transmitting mechanisms is selectively engageable to interconnect the first member of the fourth planetary gear set with the stationary member.

12. The transmission of claim 11 wherein the sixth of the seven torque transmitting mechanisms is selectively engageable to interconnect the third member of the second planetary gear set, the second member of the third planetary gear set, and the second member of the fourth planetary gear set with the stationary member.

13. The transmission of claim 12 wherein a seventh of the seven torque transmitting mechanisms is selectively engageable to interconnect the third member of the first planetary gear set with the stationary member.

14. The transmission of claim 1 wherein the third member of the first planetary gear set and first members of the second, third and fourth planetary gear sets are sun gears, the second members of the first, second, third and fourth planetary gear sets are carrier members and the first member of the first planetary gear set and third members of the second, third and fourth planetary gear sets are ring gears.

15. The transmission of claim 1 wherein the input member is continuously interconnected with the first member of the second planetary gear set and wherein the output member is continuously interconnected with the second member of the first planetary gear set, the third member of the third planetary gear set, and the second member of the fourth planetary gear set.

16. A transmission in a motor vehicle, the transmission comprising:
   an input member;
   an output member;
   first, second, third and fourth planetary gear sets each having first, second and third members;
   a first interconnecting member continuously interconnecting the first member of the first planetary gear set with the second member of the second planetary gear set;
   a second interconnecting member continuously interconnecting the second member of the first planetary gear set with the third member of the third planetary gear set and the third member of the fourth planetary gear set; and
   a third interconnecting member continuously interconnecting the third member of the second planetary gear set with the second member of the third planetary gear set and the second member of the fourth planetary gear set;
   a first torque transmitting mechanism selectively engageable to interconnect the input member and the first member of the second planetary gear set with the first member of the third planetary gear set;
   a second torque transmitting mechanism selectively engageable to interconnect the input member and the first member of the second planetary gear set with the third member of the second planetary gear set, the second member of the third planetary gear set, and the second member of the fourth planetary gear set;
   a third torque transmitting mechanism selectively engageable to interconnect the first member of the fourth planetary gear set with the third member of the second planetary gear set, the second member of the third planetary gear set, and the second member of the fourth planetary gear set;
   a fourth torque transmitting mechanism selectively engageable to interconnect the first member of the third planetary gear set with the stationary member;
   a fifth torque transmitting mechanism selectively engageable to interconnect the first member of the fourth planetary gear set with the stationary member;
   a sixth torque transmitting mechanism selectively engageable to interconnect the third member of the second planetary gear set, the second member of the third planetary gear set, and the second member of the fourth planetary gear set with the stationary member, wherein the sixth torque transmitting mechanism is in the engaged state during a first forward gear;
   a seventh torque transmitting mechanism selectively engageable to interconnect the third member of the first planetary gear set with the stationary member; and
   a latching mechanism connected to the sixth torque transmitting mechanism, wherein the latching mechanism latches the sixth torque transmitting mechanism in the ready state, and
   wherein the torque transmitting mechanisms are selectively engageable in combinations of at least two to establish at least nine forward speed ratios and at least one reverse speed ratio between the input member and the output member.

17. The transmission of claim 16 wherein the sixth torque transmitting mechanism is in the ready state during a reverse gear.

18. The transmission of claim 16 wherein the latching mechanism latches the sixth torque transmitting device in preparation for an engine stop event of the motor vehicle.

19. The transmission of claim 16 wherein the third member of the first planetary gear set and first members of the second, third and fourth planetary gear sets are sun gears, the second members of the first, second, third and fourth planetary gear sets are carrier members and the first member of the first planetary gear set and third members of the second, third and fourth planetary gear sets are ring gears.

20. A transmission in a motor vehicle, the transmission comprising:
   an input member;
   an output member;
   first, second, third and fourth planetary gear sets each having first, second and third members;
   a first interconnecting member continuously interconnecting the first member of the first planetary gear set with the second member of the second planetary gear set;
   a second interconnecting member continuously interconnecting the second member of the first planetary gear set with the third member of the third planetary gear set and the third member of the fourth planetary gear set;
   a third interconnecting member continuously interconnecting the third member of the second planetary gear set with the second member of the third planetary gear set and the second member of the fourth planetary gear set;
   seven torque transmitting mechanisms selectively engageable to interconnect one of the first, second, and third members with at least one other of the first members, second members, third members and a stationary member, wherein the torque transmitting mechanisms are selectively engageable in combinations of at least two to establish at least nine forward speed ratios and at least one reverse speed ratio between the input member and the output member; and
   a latching mechanism connected to a sixth of the seven torque transmitting mechanisms, wherein the latching mechanism latches the sixth torque transmitting mechanism in a ready state, and
   wherein the sixth torque transmitting mechanism is in the ready state during a first forward gear.

* * * * *